United States Patent

[11] 3,552,531

[72] Inventor Albert Grosseau
Chaville, France
[21] Appl. No. 839,358
[22] Filed July 7, 1969
[45] Patented Jan. 5, 1971
[73] Assignee Societe Anonyme Andre Citroen
Berliet, Panhard, France
a corporation of France
[32] Priority July 8, 1968
[33] France
[31] No. 3525

[54] SYNCHRONISED GEAR BOX
5 Claims, 2 Drawing Figs.
[52] U.S. Cl. .................................................... 192/53,
74/339
[51] Int. Cl. ...................................................F16d 11/00,
F16h 3/38
[50] Field of Search........................................ 192/53(.6),
105, 53(.7); 74/339

[56] References Cited
UNITED STATES PATENTS
2,429,789  10/1947  Bachman et al. .............. 192/53(.6)
3,001,623   9/1961  Fawick .......................... 192/105(B)
3,414,098  12/1968  Kelbel ........................... 192/53(.6)
3,450,240   6/1969  Lewis et al..................... 74/399X Primary Examiner—Leonard H. Gerin
Attorney—Karl F. Ross ABSTRACT: A synchronized gear box comprises a pinion rotatably mounted on a shaft and an externally toothed hub mounted for rotation with the shaft. The pinion includes a conical friction surface that is in permanent engagement with a conical friction surface of a synchronizing ring. A lug projecting axially from the ring is located in an axial groove in the hub whereby the ring is rotated with the hub, but has limited angular movement relative thereto. During rotation of the hub a ball movable in a radial passage therein is centrifugally forced into engagement with an axially inclined surface the lug thus thrusting the friction surface of the ring into driving engagement with the friction surface of the pinion. When the pinion and hub are rotating at the same speed teeth on the external surface of the synchronizing ring allow an internally toothed selector ring to slide over the synchronizing ring to positively connect the hub to the pinion.

PATENTED JAN 5 1971

3,552,531

ALBERT GROSSEAU
INVENTOR

BY Karl G. Ross
Attorney 3,552,531

SYNCHRONISED GEAR BOX

FIELD OF THE INVENTION

The present invention relates to synchronized gear boxes.

SUMMARY OF THE INVENTION

According to the invention, there is provided a gear box comprising a rotatable shaft, a pinion rotatably mounted on said shaft, said pinion including a conical friction surface, hub means mounted for rotation with said shaft, synchronizing ring means mounted on said shaft for limited angular movement relative to said hub means, said synchronizing ring means including a conical friction surface, centrifugal means operative upon rotation of said hub means to thrust said synchronizing ring means axially relative to said shaft whereby the conical friction surface on said synchronizing ring means is thrust into driving engagement with the conical friction surface on said pinion, selector means operative to positively connect said pinion and said hub means, and means on said synchronizing ring means for preventing said positive connection until the rotational speeds of said hub means and said pinion are the same.

BRIEF DESCRIPTION OF THE DRAWINGS

An embodiment of the invention will now be described by way of example with reference to the accompanying drawings, in which.

Figure 1:
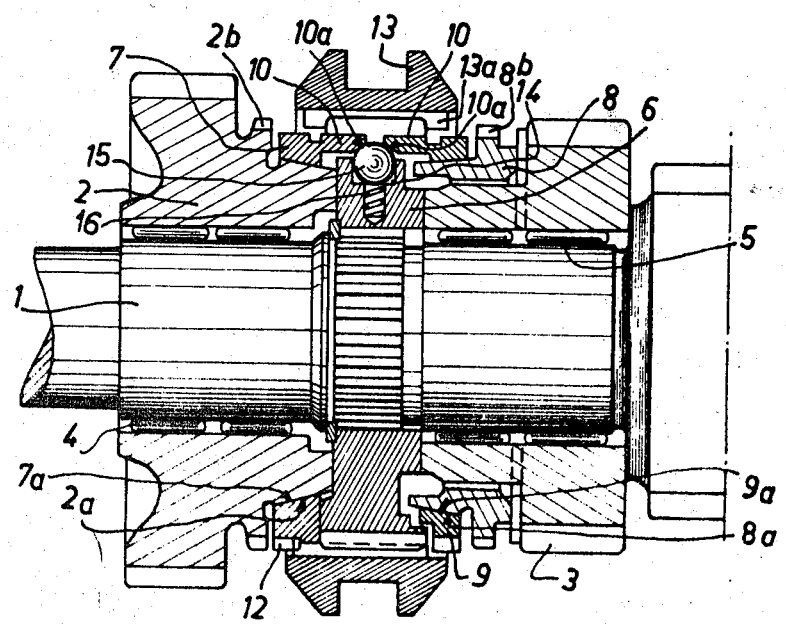
FIG. 1 is an axial section through a gear box.
Figure 2:
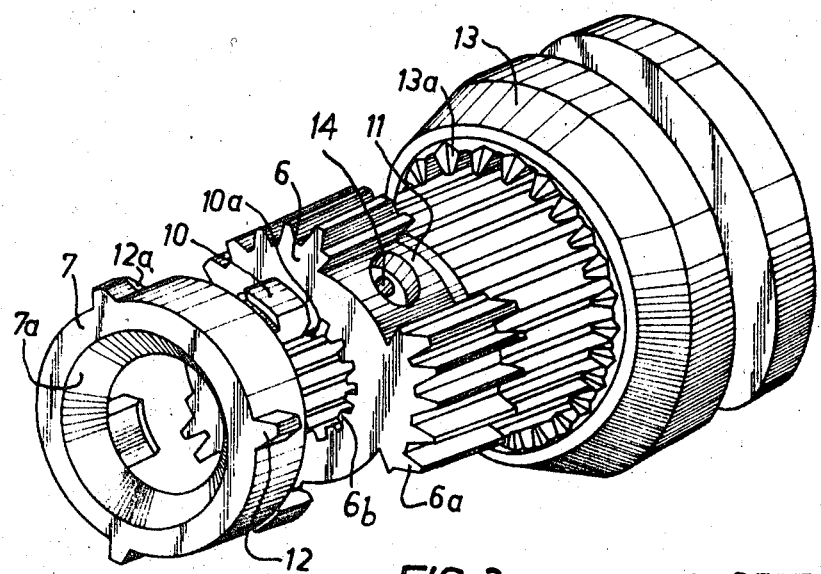
FIG. 2 is an exploded view of parts of the gear box shown in FIG. 1.

As shown in the drawings, a gear box comprises a shaft 1 on which two pinions 2 and 3, mounted on needle bearings 4 and 5 respectively, can freely rotate.

Between the two pinions 2 and 3 there is arranged a synchronizing hub 6 having internal teeth 6b which engage with corresponding teeth on the shaft 1. The hub 6 is thus rotatable with the shaft 1.

The pinion 2 has an external conical surface 2a which supports the inner conical surface 7a of a synchronizing ring 7. The pinion 3 is rotatable with a ring 8 having an external conical surface 8a which supports the conical surface 9a of a synchronizing ring 9.

Each of the synchronizing rings 7 and 9 has a number of lugs 10, three in the embodiment shown, which are engaged in a respective number of slots 11 in the synchronizing hub 6, so that the hub drives the rings, but the rings can rotate in relation to the hub through a limited angle. Moreover, each of the rings also has teeth 12, which project from the outer surface thereof; the edge of one of these teeth adjacent the hub 6 has two chamfers 12a which are symmetrical in relation to the median longitudinal plane of the tooth.

A selector 13, moved by a fork (not shown) is mounted so as to slide on the synchronizing hub 6 and on pinions 2 and 3. The selector has internal teeth 13a which can engage with the teeth 6a of the hub 6 and with teeth 2b or 8b of the pinion 2 or ring 8 respectively, thus connecting the hub 6 to the pinion 2 or 3, according to the position of the selector. The angular position of the teeth 12 is so arranged that when the lugs 10 contact one of the sides of the slots 11, they are opposite the teeth 13a of the selector 13, and thus prevent the teeth 13a from engaging between the teeth 2b and 8b of the pinion 2 or of the ring 8.

Each of the slots 11 of the hub 6 includes a recess 14 in which a ball 15 is placed. This ball 15 is adjacent the inclined edges 10a of lugs 10 on the synchronizing rings 7 and 9.

The gear box operates as follows:

When the shaft 1 is rotated, it drives the synchronizing hub 6. Through the action of centrifugal force, the balls 16 are forced against the edges 10a of the lugs 10 of the synchronizing rings 7 and 9. Due to the inclined edges 10a, each of these rings is thus subjected to an axial thrust which applies the surfaces 7a and 9a, respectively, against the surfaces 2a and 8a. The weight of the balls 15 is determined by taking into account the angle of the edge 10a, so that this axial thrust does not break, even at high speed, a film of oil between the surfaces 2a and 7a and between the surfaces 8a and 9a.

The pinions 2 and 3 at first rotate at a different speed from that of the shaft 1, i. e. from that of the synchronizing hub 6, the rings 7 and 9 rotating in relation to the hub 6 until the lugs 10 strike against the sides of the slots 11. The synchronizing device is then "cocked," i.e. the teeth 12 on the rings 7 and 9 are ready to receive the selector 13, but limit the shift of the selector while the shaft 1 and the pinion concerned are not rotating at the same speed.

When the speed of the pinions 2 and 3 is equal to that of the shaft 1, it is possible to effect the positive drive of either of these pinions. If, for this purpose, the selector 13, is moved to the left, the teeth 13a of that selector meet the chamfers 12a, and, by reacting on the chamfers, cause the synchronizing ring 7 to rotate slightly, whose teeth 12 are shifted out of the path of the teeth 13a. The movement of the selector 13 can thus continue so that its teeth engage between the teeth 2b of the pinion 2 thus driving the pinion 2.

When the shaft 1 is not being rotated, no centrifugal force is exerted on the balls 15, and the result is therefore no thrust on the synchronizing rings 7 and 9. These rings can thus rotate freely in relation to the pinions 2 and 3, so that the force opposing the movement of the selector 13 is practically nil and the selector can be shifted so as to engage with the pinion 2 or pinion 3. A gear can thus be freely engaged.

Preferably there is arranged at the bottom of each of the recesses 14 a spring 16 so as to exert on the corresponding ball 15 a radial thrust counteracting its weight. The ball is thus kept in contact with the edges 10a, even when stationary.

In the above described gear box the synchronizing ring is driven in permanent contact with the conical friction surface of the pinions, the effect of which is to offset the thrust distribution and make the selector immediately operative to equalize the rotational speeds of the pinions and hub since the synchronizing ring does not have to move axially to come into contact with the pinion. Thus quick and accurate changing of gear can be provided.

I claim:

1. A gear box comprising:
   a rotatable shaft;
   a pinion rotatably mounted on said shaft, said pinion including:
      a conical friction surface;
   hub means mounted for rotation with said shaft;
   synchronizing ring means mounted on said shaft for limited angular movement relative to said hub means, said synchronizing ring means including:
      a conical friction surface;
   centrifugal means operative upon rotation of said hub means to thrust said synchronizing ring means axially relative to said shaft whereby the conical friction surface on said synchronizing ring means is thrust into driving engagement with the conical friction surface on said pinion;
   selector means operative to positively connect said pinion and said hub means; and
   means on said synchronizing ring means for preventing said positive connection until the rotational speeds of said hub means and said pinion are the same.

2. A gear box according to claim 1 wherein said centrifugal means comprises ball means movable within a radial passage in said hub and engageable against an axially inclined surface on said synchronizing ring means.

3. A gear box according to claim 2 wherein said ball means is biased radially outwards by resilient means, the biasing force being substantially equal to the weight of said ball means.

4. A gear box according to claim 2 wherein the said synchronizing ring means includes lug means extending axially into an axial groove in said hub said lug means including said axially inclined surface.

5. A gear box according to claim 1 wherein said hub means is externally toothed and wherein the said selector means operative to positively connect said hub means and said pinion comprises an internally toothed ring movable axially relative to said shaft into engagement with the teeth on said pinion and said hub means.